United States Patent [19]

Kelly et al.

[11] Patent Number: 4,522,115
[45] Date of Patent: Jun. 11, 1985

[54] VENTILATOR FOR VEHICLE

[75] Inventors: Timothy A. Kelly; Rueben M. Turbyfill, both of Salem, Va.

[73] Assignee: Ventilator Associates, Salem, Va.

[21] Appl. No.: 518,661

[22] Filed: Jul. 29, 1983

[51] Int. Cl.³ .............................................. B60H 1/26
[52] U.S. Cl. .................................... 98/2.14; 296/216
[58] Field of Search ................. 98/2.14; 296/216, 217; 49/149, 192, 193; 16/231, 232, 287, 292, 297, 371

[56] References Cited

U.S. PATENT DOCUMENTS

| | | | |
|---|---|---|---|
| 2,865,653 | 12/1958 | Nixon | 16/292 |
| 4,021,073 | 5/1977 | Manning | 98/2.14 |
| 4,329,917 | 5/1982 | Fisher et al. | 98/2.14 |
| 4,395,939 | 8/1983 | Hough et al. | 98/2.14 |

FOREIGN PATENT DOCUMENTS 1584190 3/1970 Fed. Rep. of Germany ........ 49/192
47907 7/1979 Fed. Rep. of Germany ...... 296/216

Primary Examiner—Henry C. Yuen
Assistant Examiner—John Kwon
Attorney, Agent, or Firm—Wilmer Mechlin

[57] ABSTRACT

Ventilator for roof or other wall of a vehicle in which an opening in the wall is normally closed by a closure member and the closure member is connected to the wall at each of a pair of opposite sides by a pair of spring-and-link assemblies enabling the closure member to be opened to any of five positions and yieldably held by spring force in closed and each open position. By mounting inside the spring-and-link assemblies a trim ring and coacting screen plate mounted respectively on the wall and the closure member, the ventilator is adapted to screen against entry of bugs or other foreign matter in all open positions of the closure member.

13 Claims, 8 Drawing Figures

VENTILATOR FOR VEHICLE

BACKGROUND OF THE INVENTION

Heretofore, as disclosed in Manning U.S. Pat. No. 4,021,073 and Fisher et al U.S. Pat. No. 4,329,917, ventilators for vehicle roofs have been proposed in which a closure member, lid, or panel for closing an opening in a vehicle roof, is connected to the roof by a plurality of link-and-spring assemblies which enable it to be opened to any of a plurality of positions and yieldably resist by the spring or springs of the assemblies movement of the closure member from closed or any open position. Of these patents, in Manning the springs of the connecting assemblies are each a coil spring in compression mounted in a tube fixed to the closure member and acting at opposite ends on plungers, each pivotally connected to one end of one of the links, the other end of which is pivotally connected to a mounting plate fixed to a frame bounding the opening in the roof. As opposed to Manning, Fisher et al pivotally mounts one end of each link and the compression coil spring in a box fixed to a frame bounding the roof opening and applies the force of the spring to the link through a ball contained in the box and alternately fittable in each of three sockets in the adjoining end of the link corresponding to full, partly open and closed positions of an adjoining side of the closure member. In both patents over-center relations between the pivot pins at opposite ends of each link in the open and closed positions of the adjoining side of the closure member, are designed to enable the associated spring to yieldably resist movement of the side out of those positions. It is to an improvement in vehicle ventilators such as disclosed in Manning and Fisher, that the present invention is primarily directed.

SUMMARY OF THE INVENTION

The primary object of the present invention is to provide an improved ventilator for an opening in a wall of a vehicle having a closure member connected at a pair of opposite sides to a frame bounding the wall opening by a pair of spring-and-link assemblies, wherein the spring and link of each assembly are connected adjacent opposite ends to and act between the closure member and opening frame for enabling the closure member to be moved against yieldable resistance to closed and any of a plurality of open positions.

Another object of the invention is to provide an improved ventilator of the character described in the preceding object, wherein the closure member is generally rectangular and enabled selectively to be moved between a normal closed position, a fully open position and a plurality of partly open positions in each of which the closure member is open on one and closed on the opposite side.

An additional object of the invention is to provide an improved ventilator for an opening in a wall of a vehicle wherein a closure member, for movement relative to the wall between a plurality of selected positions, is connected to the wall by a plurality of spring-and-link assemblies, the spring and link of each of which is connected adjacent opposite ends to and acts between the closure member and wall.

A further object of the invention is to provide an improved ventilator for an opening in a vehicle wall which not only has a closure member connected to the wall by a plurality of spring-and-link assemblies, the spring and link of each of which are connected adjacent opposite ends to and act between the closure member and wall for enabling the closure member to be moved relative to the wall between a plurality of selected positions, but a rigid foraminous skirt fixed to and instanding from the closure member and a cooperating trim ring fixed to and outstanding from a frame about the wall opening for screening the opening from entry of insects or other foreign matter into the opening in any of the partly or fully open positions of the closure member.

Another object of the invention is to provide in a ventilator having a closure member for opening and closing an opening in a vehicle wall, a link-and-spring assembly whereof both the link and the spring are pivotally connected adjacent opposite ends to connecting and pivot pins on the closure member and wall, respectively, the spring is a C-spring rectangular in cross-section and out-turned at opposite ends for receiving and acting in compression between the pins and the link is pivotally connected to the pivot pin and pin-and-slot connected to the connecting pin.

A further object of the invention is to provide a spring-and-link assembly according to the immediately preceding object, wherein the closure member connecting pin is mounted on a bracket rigid with and instanding from the closure member and a second pin on the bracket outwardly of the pivot pin, on swinging of the link about the pivot pin outwardly toward the closure member, is engageable with an adjoining side of the link for limiting outward movement of said member.

An additional object of the invention is to provide in a ventilator for an opening in the wall of a vehicle, a spring and-link assembly for connecting a closure member to said wall about said opening for movement relative to said wall between a plurality of positions including open and closed positions, the spring and link each being swingably connected adjacent opposite ends to a pair of pins, one mounted on said wall and the other on said closure member, the spring being a C-spring compressed between said pins and the closure member pin being over-center relative to the wall pivot pin in each of the plurality of positions of the closure member relative to the wall.

The foregoing and other objects and advantages of the invention will appear hereinafter in the detailed description, be particularly pointed out in the appended claims, and be illustrated in the accompanying drawings, in which:

FIGURE DESCRIPTION

Figure 7:
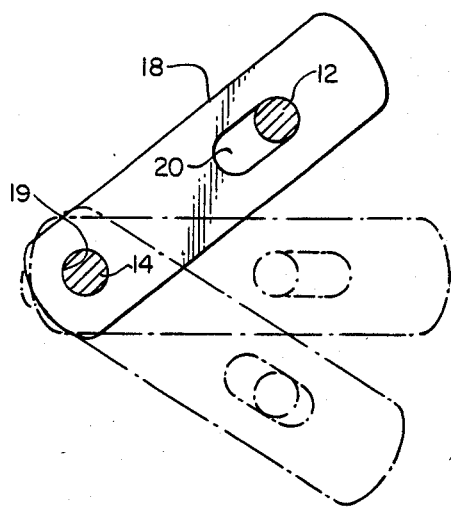
Figure 8:
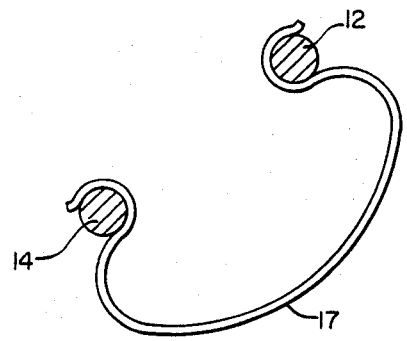

FIG. 7 is an enlarged side elevational view of a link of one of the spring-and-link assemblies showing extreme and intermediate positions of the link and the corresponding positions of the connecting pin on the closure member relative to the slot in the link and pivot pin on the mounting plate fixed to the wall; and FIG. 8 is a side elevational view on the scale of FIG. 7 of the C-spring of one of the spring-and-link assemblies in the open position of the closure member.

DETAILED DESCRIPTION

Referring now in detail to the drawings in which like reference characters designate like parts, the improved ventilator of the present invention is adapted for opening and closing an opening in a roof or other wall of a vehicle whether the wall is generally horizontal or vertical and is particularly designed for installation on vehicles such as buses in which, as in the illustrated embodiment, it is desirable that the closure member of the ventilator open fully as well as toward the front, back, and either side of the vehicle.

Generally rectangular in the illustrated embodiment but variable in shape as befits the wall in which it is installed, the improved ventilator 1 is comprised of a frame 2 fitted, seated or mounted in an opening 3 in a roof or other wall 4 of a vehicle not otherwise shown. Fixed to the wall 4 about the opening 3, the frame 2 bounds a central opening 5 in the ventilator alternately closable and openable by a closure member or door 6. Having one closed and five fully or partly open positions, the closure member 6 of the illustrated ventilator 1 is connected and adapted to be moved between and yieldably held in any of its positions relative to the frame 2 by spring-and-link assemblies 7 of which, for the illustrated multi-position closure member, there are two counterpart pairs, one on each of a pair of ordinarily parallel opposite sides 8 of the frame 2.

Each of the assemblies 7 includes a mounting bracket 9 fixed as by riveting to an underside 10 of the closure member 6 and having a suitably flat body or body flange 11 instanding or depending from the closure member substantially normal to the latter's underside and laterally within or spaced inwardly of and parallel to the plane of the frame's adjoining side 8. Fixed to and extending through the bracket body 11 toward and normal or perpendicular to the adjoining frame side 8, are preferably a pair of radially spaced pins suitably positioned in alignment or tandem normal to the closure member's underside 10, one an inner or lower connecting pin 12 and the other an outer or upper stop pin 13. Each of the assemblies 7 also has as another pin, a pivot pin 14 which is fixedly mounted on and projects inwardly from the adjoining side 8 of the frame 2 and conveniently has as its mounting one of a pair of laterally inset ears or abutments 15 at opposite upper corners of a mounting plate 16 attached, as by bolting, to and extending longitudinally of the frame's side 8 and mounting on its other ear the pivot pin for the second assembly on that side. While usually a single plate common to and of a length to suit the desired spacing between the associated assemblies 7, if more practical for a particular installation, the mounting plate 16 can be separate mounting plates, one for each assembly.

Other components of each of the spring-and-link assemblies 7 are a spring 17 and a link 18, each connected to and connecting and acting on the connecting and pivot pins 12 and 14 of its assembly. Of these components, the spring 17 preferably is a precompressed C-spring, rectangular or flat in cross-section and pivotally receiving or seating the connecting and pivot pins in out-turned or reverse curved end portions 19 and resisting in compression relative movement of those pins. The other component, the link 18, may be a single link at one side of the spring 17 or, as illustrated, a double link formed by a pair of duplicate links sandwiching or on opposite sides of the spring. As shown in FIG. 7, the illustrated single or pair of links may each have adjacent one end a circular aperture 19 of substantially the diameter of the pivot pin 14 for pivoting or swinging about an axis concentric with that of the pin and, adjacent the opposite end, a longitudinally elongated slot 20 for a pin-and-slot connection to the connecting pin 12. However, the purpose of the slot 20 is to accommodate displacement of the closure member 6 in a direction parallel to the sides 8 of the frame 2 on which the spring-and-link assemblies are mounted and, if slots in a pair of corresponding assemblies on opposite sides of the frame are sufficiently long to accommodate the displacement, slotting of the other pair of assemblies can be dispensed with.

Figure 1:
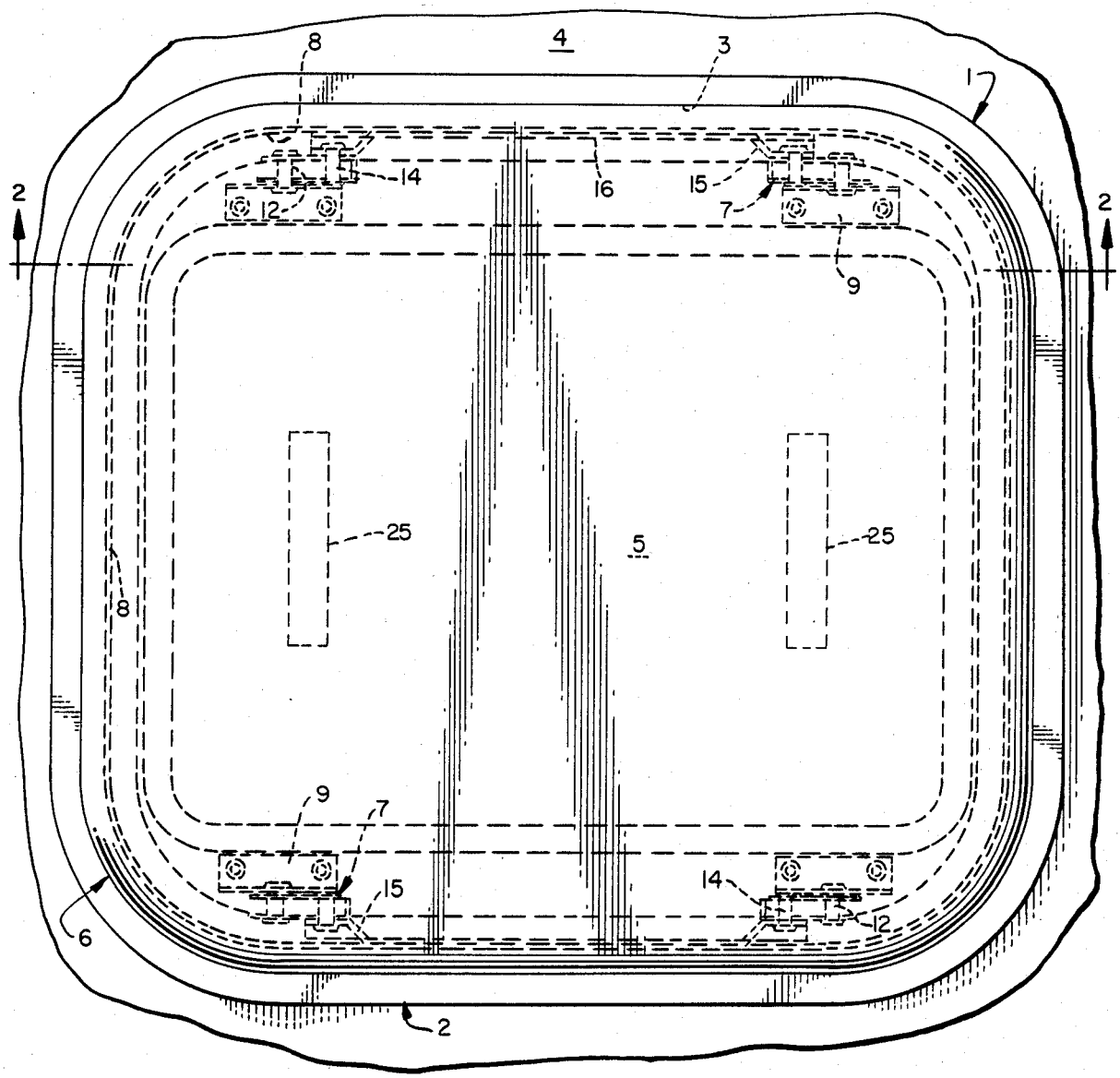
FIG. 1 is a plan view of a preferred embodiment of the improved ventilator of the present invention with the trim ring and screen plate removed.
Figure 2:
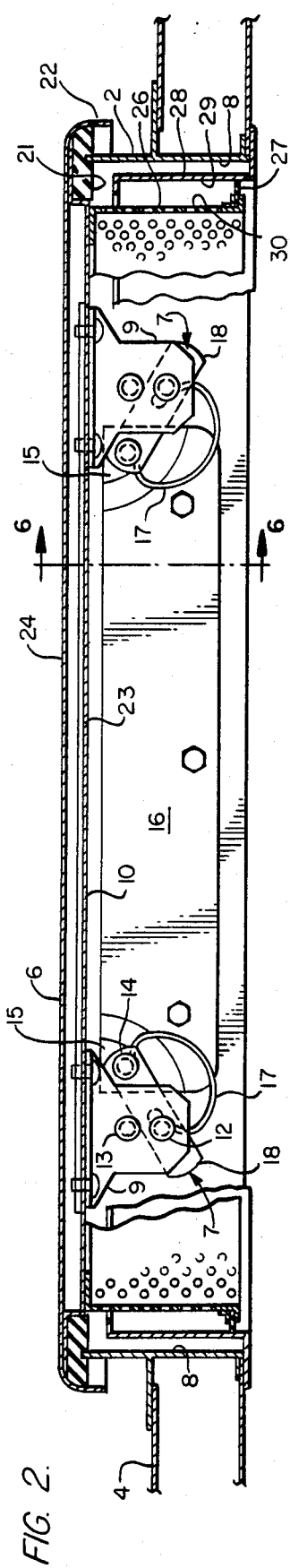
FIG. 2 is a vertical sectional view taken along lines 2—2 of FIG. 1 with the trim ring and screen plate in place and the closure member in closed position.
Figure 3:
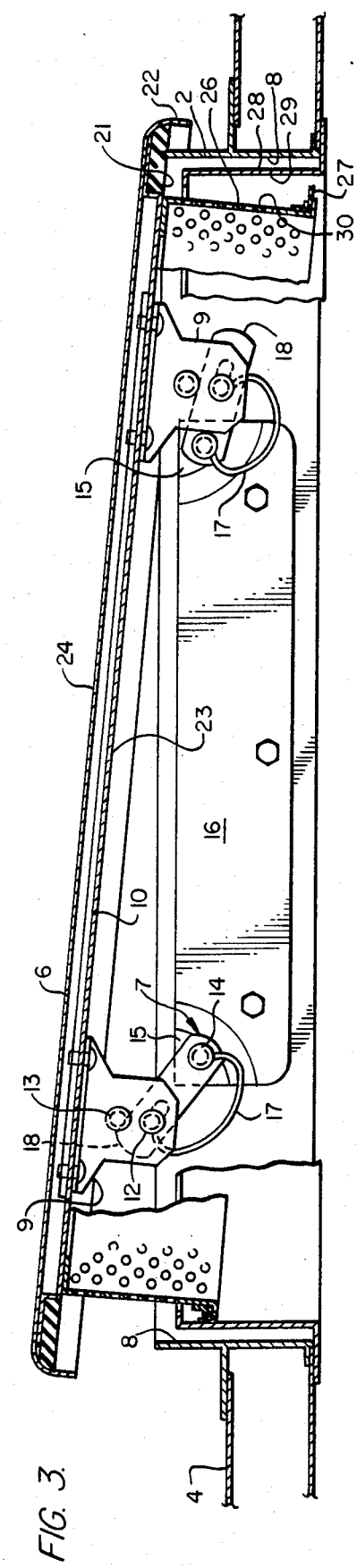
FIG. 3 is a vertical sectional view of the same structure and on the same section as FIG. 2 but with one side of the closure member open.
Figure 4:
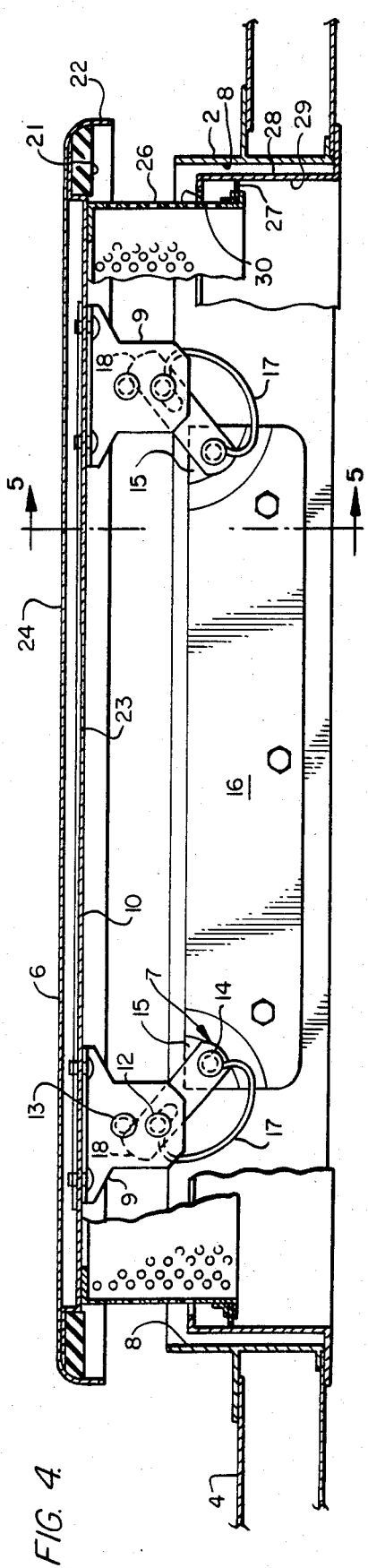
FIG. 4 is a vertical sectional view of the structure and on the section of FIG. 2 but with the closure member in open position.
Figure 5:
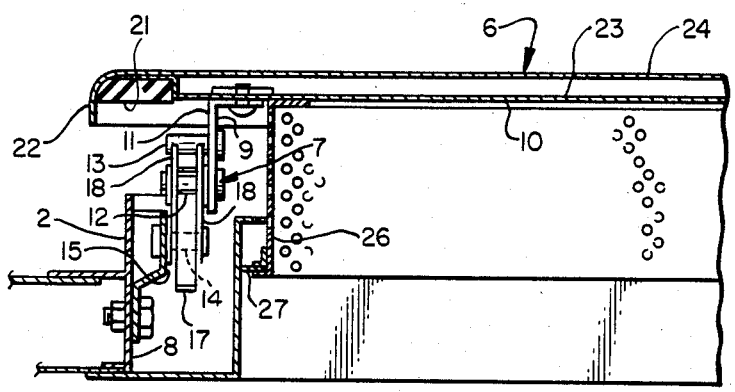
FIG. 5 is a fragmentary vertical sectional view taken along lines 5—5 of FIG. 4.
Figure 6:
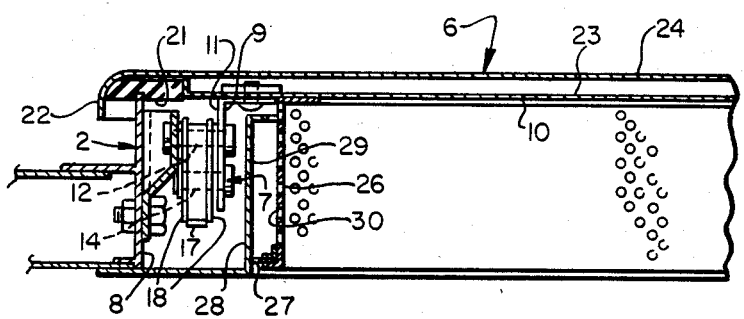
FIG. 6 is a fragmentary vertical sectional view taken along lines 6—6 of FIG. 2.

The relative dispositions of the connecting, stop and pivot pins 12, 13 and 14 of each of the assemblies 7, is critical to the intended operation of the ventilator 1. As shown in FIG. 2–4, the closure member 6 is alternately positionable in a closed position in which a gasket 21 mounted on or bonded to the closure member inside a depending peripheral flange 22, engages and seals against the upper end of the frame 2 in a partly opened position in which the side 8 normal to those mounting the assemblies 7 is open and the opposite side closed and a fully open position in which the closure member is open on all sides. Aside from these three positions, it is plain from FIG. 3 that the open and closed ends or sides of the closure member 6 can be reversed in a fourth possible position. In addition, although the postions are not shown in the drawings, the lateral play in each of the assemblies enables the closure member 6 to be tilted upwardly for individually opening either of the sides corresponding to those on which the frame 2 mounts a pair of the assemblies 7. In all of these positions, the critical relative disposition of the connecting and pivot pins 12 and 14 of each of the assemblies 7 is such that, whether the adjoining side of the closure member is open or closed, the connecting pin is over-center relative to the pivot pin, above or outward when the adjoining side is open and below or inward when that side is closed. With the connecting and pivot pins 12 and 14 so relatively disposed, the springs 17 not only yieldably resist movement of the closure member out of any selected position, but give to the assemblies involved a snap action to selected position as their connecting pins swing past center relative to their pivot pins.

Bowed or bulged inwardly or downwardly away from and concave or opening upwardly or outwardly toward the closure member 6, the compression C-spring 17 of each of the several spring-and-link assemblies 7 does not engage or contact the third pin of each assembly, the stop pin 13, over the range of movement of the closure member relative to the frame 2. Were this also true of the link or links 18 of each assembly, the closure member 6, while held against longitudinal or lateral movement relative to the frame 2 in any position in which a side of the frame is engaged by the gasket 21 on the closure member, in the latter's full open position in which there is no such engagement, the closure member would be able to oscillate or swing back and forth relative to the frame in a direction parallel to the planes of the sides of the frame 2 mounting the assemblies 7, absent means for restraining such movement. This and limiting outward movement of adjoining sides of the closure member 6 are functions of the stop pins 13, they perform by engaging the confronting sides of the related links 17 longitudinally between or intermediate the connecting and pivot pins 12 and 14 on outward pivoting of the link or links of any assembly.

In the illustrated embodiment, the closure member 6, laterally within or inside the gasket 21, is hollow or double-walled with its underside 10 formed by an inner panel or plate 23 fixed to or rigid with and spaced inwardly of a cover or outer panel or plate 24 terminating laterally in or bounded peripherally by the flange 22. Fixed to or rigid with and instanding or depending from the inner panel 23 and spaced from each other and sides of the inner panel, are a pair or plurality of handles or hand grips 25 for manually moving the closure member 6 from one to another of its several positions against the yieldable resistance of all or certain of the springs 17.

In installations of the ventilator 1, particularly on buses or other vehicles, it usually will be desirable to have the operating mechanism, the assemblies 7, covered, both for neatness of appearance and to discourage tampering and the ventilator also should be substantially bug-proof in any open position of the closure member 6. For these purposes, desirable additions to the ventilator are a foraminous, preferably punched-hole screen or screen plate 26 in the form of an annular or tubular skirt secured or fixed to and depending or instanding from the underside 10 of the closure member 6 and spaced laterally inwardly of and conforming generally in contour to the frame 2. The screen plate in the closed position of the closure member 6, terminates downwardly or inwardly short of or above the bottom of the frame and mounts on its bottom portion a laterally outstanding wiper or wiper blade 27.

Encircling or surrounding and telescopingly receiving the screen plate 26 and interposed therebetween and the frame 2 and spring-and-link assemblies 7 mounted thereon and interiorly covering the assemblies in the closed position of the closure member 6, is an inner cover or trim ring 28 fixed or secured at the bottom to the lower end of the frame. Upstanding or extending upwardly in the frame 2 substantially normal or at right angle to the wall 4 and the closure member 6 in the latter's closed position, with a side or web 29 spaced from and substantially parallel to a confronting side 30 of the screen plate 26, the trim ring 28 terminates upwardly or outwardly, downwardly of or below the upper extremity of the frame 2 and the spacing of its side from that of the screen plate is such that the flexible wiper blade 27 on the screen plate contacts and wipes or rubs against the side of the trim ring except when, in a partly open position, the closure member 6 is closed on and tilted downwardly toward one side of the frame. And even in the latter case, as shown in FIG. 3, the opening between the wiper blade 27 and the side 29 of the trim ring 28 is narrow and reachable only through a restricted passage leading thereto between the sides of the screen plate and trim ring. Since the screen plate 26 moves in unison with the closure member 6 and the wiper blade 27 is in constant contact with the trim ring 28 except on one side when the ventilator is closed on that and open on the opposite side, and even then is narrowly spaced from the trim ring, the coaction or cooperation of the screen plate and trim ring, for practical purposes, effectively screens the opening 3 against bugs and other debris or foreign matter over the range of movement of the closure member 6 relative to the frame 2.

From the above detailed description it will be apparent that there has been provided an improved ventilator for a wall of a vehicle and a spring-and-link assembly therefor in which a closure member is movable between any of a multiplicity of positions relative to a wall and yieldably held in any position by the force of the springs of certain of the assemblies, the ventilator, if desired, including a screen fixed to and movable with the closure member and cooperating with a stationary trim ring on the wall for obstructing entry of bugs and other debris into the vehicle through the ventilator. It should be understood that the described and disclosed embodiment is merely exemplary of the invention and that all modifications are intended to be included that do not depart from the spirit of the invention and the scope of the appended claims.

Having now described our invention, we claim:

1. A ventilator for a roof or other wall of a vehicle, comprising a frame mounted on and bounding an opening in said wall, a closure member, spring-and-link assemblies connecting said closure member at opposite sides to corresponding sides of said frame, said assemblies each including a pair of pin means each mounted on a different of said frame and closure member, and spring means and link means each connecting adjacent opposite ends to and acting between said pair of pin means for enabling said closure member to be moved against yieldable resistance between closed and any of a plurality of open positions.

2. A ventilator according to claim 1, wherein the spring means and link means of each assembly are respectively a spring pivotally connected to and acting in compression between the pair of pin means and link means pivotally connected to the pin means on the frame and swingably connected to the pin means on the closure member.

3. A ventilator according to claim 2, wherein the swingable connection of the link means of certain of the assemblies to the pin means on the closure member is a pin-and-slot connection for accommodating displacement of the closure member relative to the frame in a direction parallel to sides of the frame mounting the assemblies.

4. A ventilator for a roof or other wall of a vehicle, comprising frame means mounted on and bounding an opening in said wall, a closure member, spring-and-link assembly means connecting said closure member to said frame means for movement relative thereto between closed and open positions, said assembly means each including pivot and connecting pins mounted respectively on said frame means and closure member, spring means pivotally connected adjacent opposite ends to said pivot and connecting pins, and link means connected pivotally to said pivot pins and swingably to said connecting pin, said assembly means enabling said closure member to move between closed position and any of a plurality of side and full open positions relative to said frame, and said connecting pin of each of said assembly means in each of said positions being over-center relative to said pivot pin thereof for yieldably resisting movement of said closure member out of said position.

5. A ventilator according to claim 4, including a stop pin mounted on the closure member therebetween and the connecting pin and engageable with a confronting side of the link means for limiting outward movement of the closure member relative to the frame means.

6. A ventilator according to claim 5, wherein the closure member is connected at each of a pair of opposite sides to corresponding sides of the frame means by a spaced pair of the spring-and-link assembly means, and the assembly means are so constructed and arranged as to enable the closure member to be moved relative to the frame means against yieldable resistance between closed and open positions and each of a plurality of partly open positions in which the closure member slopes upwardly toward and is fully open along only one side.

7. A ventilator according to claim 1, including trim ring means stationarily mounted at a bottom on and extending upwardly in and laterally inside said frame means, and screen means secured for movement in unison to and instanding from said closure member, said screen means extending into and cooperating with said trim ring means for obstructing entry of foreign matter into said opening.

8. A ventilator according to claim 7, including flexible wiper means carried by and projecting laterally from said screen means and wiping against a confronting side of said trim ring means for substantially sealing said opening against entry of foreign matter.

9. A ventilator according to claim 8, wherein said flexible wiper means is in contact with said trim ring means except when the closure member is open on only one side and then is spaced from an opposite side of said trim ring means.

10. In a ventilator for a roof or other wall of a vehicle, the combination with frame means mounted on and bounding an opening in said wall, and a closure member for opening and closing said opening, of spring-and-link assembly means for connecting said closure member to said frame means for movement relative thereto, said assembly means each including pivot and connecting pins mounted respectively on the frame means and closure member, spring means pivotally connected adjacent opposite ends to said pivot and connecting pins, and link means connected pivotally to said pivot pin and swingably to said connecting pin, said assembly means enabling the closure member to move between closed position and any of a plurality of side and full open positions relative to said frame, and said connecting pin of each of said assembly means in each of said positions being over-center relative to said pivot pin thereof for yieldably resisting movement of said closure member out of said position.

11. A ventilator according to claim 10, wherein each assembly means includes a stop pin mounted on the closure member therebetween and the connecting pin and engageable with a confronting side of the link means for limiting outward movement of the closure member relative to the frame means.

12. A ventilator according to claim 4 including for each assembly means a mounting bracket fixed to and instanding from an underside of the closure member and mounting the connecting pin thereof, and plate means mounted on an adjoining side of the frame means and mounting the pivot pin of said assembly means, said pins extending normal and said spring and link means being swingable about said pivot pin parallel to the adjoining side of the frame means.

13. A ventilator according to claim 5 including for each assembly means a mounting bracket fixed to and instanding from and underside of the closure member and mounting the connecting pin thereof, and plate means mounted on an adjoining side of the frame means and mounting the pivot pin of said assembly means, said pins extending normal and said spring and link means being swingable about said pivot pin parallel to the adjoining side of the frame means.

* * * * *